Nov. 24, 1925.
J. H. MILLER
RUBBER HEEL
Filed Jan. 10, 1925
1,563,098
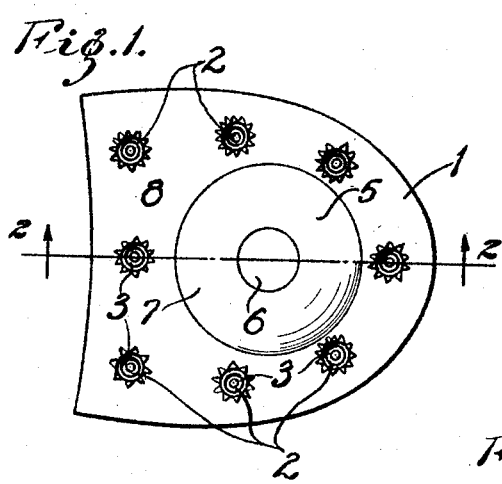
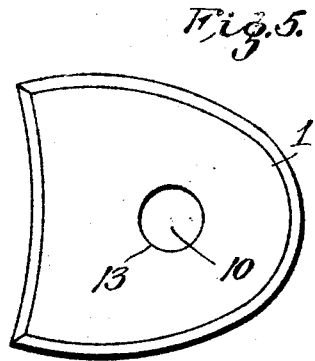
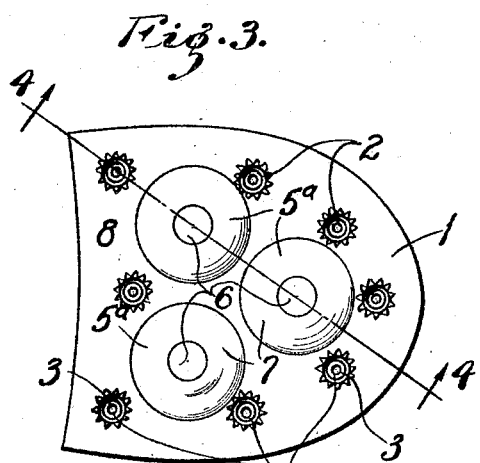
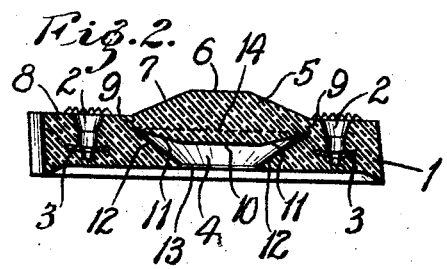
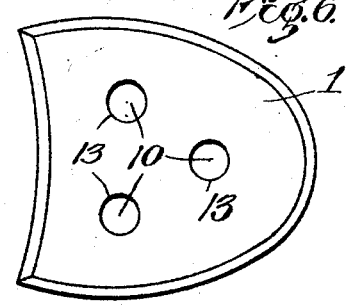
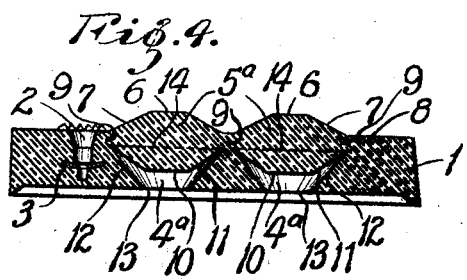
INVENTOR
JOSEPH H. MILLER
BY
ATTORNEY Patented Nov. 24, 1925.

1,563,098

UNITED STATES PATENT OFFICE.

JOSEPH H. MILLER, OF ST. LOUIS, MISSOURI, ASSIGNOR OF ONE-HALF TO EMIL SCHLAMP, OF ST. LOUIS, MISSOURI.

RUBBER HEEL.

Application filed January 10, 1925. Serial No. 1,591.

*To all whom it may concern:*

Be it known that I, JOSEPH H. MILLER, a citizen of the United States, residing in the city of St. Louis and State of Missouri, have invented new and useful Improvements in Rubber Heels, of which the following is a specification.

The object of this invention is to provide a rubber heel, or other rubber article intended to support weight, of such construction that the maximum of resiliency will be afforded, the minimum of wear will result, and in certain applications, slippage will be prevented.

To this end, the invention is characterized by providing the rubber heel or other article with one or more pneumatic cushions of novel construction, which provide a cushioning effect in addition to that provided by the resiliency of the rubber itself, such cushioning effect being in part due to the yielding of the cushion under weight, as distinguished from the compression thereof, and, in part, to pneumatic action afforded by the compression of air in pockets shaped to receive the body of the cushion as it yields under pressure.

The invention is more particularly applicable to a rubber heel, but, as indicated above, other applications are contemplated. For example, the invention may be embodied in rubber mats for use by persons whose occupation requires them to stand the greater part of the day, as, for example, tellers in banks. Another application contemplated is that to pneumatic tires, in which the construction would increase the resiliency of the tire and also tend to prevent skidding on slippery streets.

While I have shown the invention in the accompanying drawing as embodied in a rubber heel, it will be understood from the above that the same is not limited to such application.

In the drawing—

Figure 1 is a bottom plan view of a rubber heel embodying my invention;

Figure 2 is a sectional view on the line 2—2 of Figure 1;

Figure 3 is a bottom plan view illustrating a rubber heel having a plurality of cushions; and Figure 4 is a sectional view on the line 4—4 of Figure 3.

Figure 5 is a top plan view of the heel shown in Figure 1; and

Figure 6 is a top plan view of the heel shown in Figure 3.

Referring now to the drawing, the numeral 1, in all the views, indicates a heel constructed of rubber in the usual manner, and provided at various points near its edge with recesses 2, at the bottoms of which are embedded apertured washers 3 affording a bearing for the heads of nails inserted in said recesses and driven through the body of the rubber into the heel of the shoe. In molding the heel, a core is inserted in the mold of such shape that the rubber surrounding the same will provide a recess 4 of the shape shown in Figures 2 and 4, opening from the upper side of the heel. The bottom of the mold for shaping the tread surface of the heel is provided with one or more recesses of a shape to provide one or more projections 5 on the tread surface of the heel and also of the shape shown in Figures 2 and 4. These projections or cushions are frusto-conical in shape, having a flat tread surface 6 and tapering sides 7 which merge into the flat tread surface 8 of the heel. The cushions 5 are, of course, integral with the body of the heel 1, the recess 4 providing a relatively narrow portion 9 surrounding the cushion and providing a connection thereof with the body of the heel, which construction permits the cushion to yield bodily under weight or pressure. The upper side of the cushion 5 forming the bottom of the recess 4, relative to the position of the heel on the shoe, is shaped to provide a flat surface 10 and tapering walls 11 of the same size as but reversely positioned to the parts 6 and 7 of the cushion, and the upper wall of the recess is inclined, as indicated at 12, to surround an opening 13 which is substantially the size of the flat portion 10 of the upper wall of the recess.

From the above description, the cushion 5 may be considered as a symmetrical member comprising oppositely disposed flat sides 6 and 10 and oppositely directed tapering walls 7 and 11. The size of the recess 4 is the same as the size that portion of the cushion 5 which extends above the plane of the tread surface 8 of the heel and, therefore, is the size of that portion of the upper part of the cushion extending above a line 14 drawn parallel to the plane of the surface 8 and connecting the opposite sides of said recess. By this construction, when pressure is applied to the tread 6 of the cushion by the weight of the body being thrown on the heel in walking, the upper portion of the cushion will be forced inward to compress the air in the recess 4 and substantially occupy said recess, while the lower part of the cushion, by the flex of the material due to the narrow portions 9 coupled with the flexibility of the body of the cushion itself, will permit the tread portion 6 of the cushion to be brought to a position substantially flush with the tread surface 8 of the heel. In this position, the tapering walls 11 and 12 will be brought substantially into contact, and thus the necessary solid support for the body of the wearer of the heel in walking is afforded.

It will be observed that when the tread surface 6 is applied to the ground in walking, the weight of the body will be initially borne by the cushions 5 and the compressed air in the pockets or recesses 4. This not only contributes to ease and comfort in walking or standing, but in walking on slippery pavements, there is much less tendency for the heel to slip, due to the indirect or delayed application of the weight of the body to the heel proper.

The construction illustrated in Figures 3 and 4 differs from that of Figures 1 and 2, to which the above description particularly applies, only in the fact that a plurality of cushions, in this instance, three, indicated by 5ª, are employed instead of the single cushion 5. The construction of each cushion 5ª and its corresponding recess 4ª is exactly the same as that of the single cushion 5.

In the interest of brevity, the claims refer only to a rubber heel, but I wish it understood that this is not intended as a limitation of the invention to such application.

I wish it further understood that the invention is not limited to the precise construction shown nor to the particular shape of the cushion and recess shown, as various modifications both in construction and design could be made in the invention as illustrated in the drawing, without departing from the spirit of my invention.

I claim:

1. A rubber heel having a portion of its body projecting from its tread surface to form a cushion united to the heel in the plane of said surface, and provided with a recess above the cushion complemental in shape thereto.

2. A rubber heel having a portion of its body projecting from its tread surface to form a cushion, frusto-conical in shape, and provided with a recess above the cushion complemental in shape thereto.

3. A rubber heel provided with a frusto-conical recess opening from its upper side and having a portion of its body of similar shape projecting directly from its tread surface to form a cushion, and a correspondingly shaped portion projecting into said recess in spaced relation to the wall thereof, the area of said recess and of each of said projecting portions being substantially the same.

4. A rubber heel having a part of its body symmetrically shaped to project above and below the plane of the tread surface thereof, the lower projection being united to the heel in the plane of said surface, and said heel being provided with a recess complemental in size and shape to the portion of the heel projecting above the tread surface.

5. A rubber heel provided with a recess and having a portion of its body shaped to provide oppositely directed projections, said portion being suspended in said recess by a relatively thin part of the body of the heel surrounding the same, the outer side of which is flush with the tread surface of the heel, and the projections of said portion being complemental in shape and area to said recess.

6. A rubber heel provided with a frusto-conical recess and having a portion of its body shaped to provide oppositely directed frusto-conical projections, said portion being suspended in said recess in spaced relation to the wall thereof by a relatively thin part of the body of the heel surrounding the same, the outer side of which is flush with the tread surface of the heel, and the projections of said portion being of substantially the same area as said recess.

7. A rubber heel having its body shaped to provide a plurality of integral oppositely-directed projections having tapering walls, one member of each projection extending directly from the plane of the tread surface of the heel to form a cushion, and the other member extending into the interior of the heel, the heel being provided with recesses opening from the upper side of the heel, one of which surrounds each inward projecting member, the wall of each recess and the wall of each inwardly-projecting member diverging from a common plane adjacent the tread surface of the heel in a direction toward the upper surface of the heel.

In testimony whereof, I have hereunto set my hand.

JOSEPH H. MILLER.